United States Patent [19]

Neumeyer

[11] Patent Number: 4,528,920
[45] Date of Patent: Jul. 16, 1985

[54] TILLAGE AND SEEDING IMPLEMENT WITH TRAILING OPENER AND PRESS WHEEL GANGS

[75] Inventor: Lowell H. Neumeyer, Des Moines, Iowa

[73] Assignee: Deere & Company, Moline, Ill.

[21] Appl. No.: 543,633

[22] Filed: Oct. 19, 1983

[51] Int. Cl.³ .............................................. A01C 5/00
[52] U.S. Cl. ................................................... 111/85
[58] Field of Search .................. 111/84, 85, 86, 52, 111/59, 60, 62, 66, 1, 14, 53, 54, 56, 34; 172/776, 462, 497, 500, 705, 572, 573, 576

[56] References Cited

U.S. PATENT DOCUMENTS

| | | | |
|---|---|---|---|
| 1,807,115 | 5/1931 | Young | 111/54 X |
| 2,155,443 | 4/1939 | Parks et al. | 111/66 |
| 4,030,428 | 5/1977 | Truax | 111/85 |
| 4,055,126 | 8/1977 | Brown et al. | 111/85 |
| 4,116,140 | 6/1978 | Anderson et al. | 111/52 |
| 4,296,695 | 10/1981 | Quanbeek | 111/85 X |

Primary Examiner—Robert A. Hafer
Assistant Examiner—D. D. DeMille

[57] ABSTRACT

Disk openers and corresponding pivoting press wheels are mounted in gangs on the rear frame portion of a tillage implement such as a field cultivator. Individual press wheel gangs are pivotally connected to the frame by standards which are biased downwardly by spring bracket assemblies. Each gang of openers is connected to the corresponding press wheel drawbars rearwardly of the pivot so that the pivot center of each opener is dependent on press wheel position. Opener down pressure springs act through an effective moment arm which decreases as the press wheel gang pivots upwardly to provide uniform opener depth penetration on uneven ground such as where terraces exist. An air distribution system delivers seed from a tank mounted on the cultivator to the disk openers.

23 Claims, 7 Drawing Figures

TILLAGE AND SEEDING IMPLEMENT WITH TRAILING OPENER AND PRESS WHEEL GANGS

BACKGROUND OF THE INVENTION

The present invention relates generally to agricultural implements and more specifically to a combination tillage and seeding implement including furrow opener and press wheel gangs mounted in trailing relationship to the rear beam of a field cultivator or similar type tillage implement for one-pass planting of small grains.

In many farming areas, a till and drill system is employed to both work the soil and plant small grains such as wheat, oats or rye in a single operation. This system reduces the time and fuel required to plant, reduces soil compaction, and conserves moisture since the furrow is formed and compacted immediately after the soil is worked. Where such a combined operation is advantageous, terraces or rolling terrain are common so that the furrow openers must have a large range of vertical travel with reasonable down pressure in the extreme positions for uniform seeding. If the down pressure on the furrow openers is not compensated for changes in toolbar or frame elevation or rotation caused by rolling or terraced ground, changes in seeding depth will result in uneven stands. Presently available seeding systems include those which utilize relatively heavy furrow opener parts coupled with detachable torsion springs for adjustable down force. The mounting toolbar is hydraulically rotated to adjust force when the implement crosses terraces or the like. Such systems are relatively massive and expensive, and require hydraulic assist systems. As the number of moving parts increases, system reliability typically decreases. Usually the systems utilize many components which vary from those utilized with other types of drills thereby increasing production costs and the amount of inventory carried by the manufacturer and dealers.

In many till and drill systems, adjustment of the furrow openers for either staggered or in-line operation is not easily accomplished. In fine soil where few rocks or clods are present, the drilling speed can be increased by maintaining the openers in alignment, while staggering the openers reduces clogging problems in soil where rocks and clods are numerous. However, providing such an adjustment has often been relatively expensive, and converting between staggered and in-line arrangements can be a difficult and time-consuming job.

Another problem encountered with combination tillage and drilling arrangements has been providing a compact structure with adequate flexibility. Systems utilizing tandem hitching arrangements for towing a drill behind a tillage implement are usually cumbersome and difficult to connect up and maneuver. Changing between field-working and transporting modes often is time-consuming and may require more than one person. Press wheels mounted at the rear of an implement behind the turning center will be subjected to severe side forces as the implement is turned either way from the forward direction. Mounting press wheels far behind furrow openers on a single frame causes a tracking problem when rows are planted other than in a straight line.

It is therefore an object of the present invention to provide an improved planting system. It is a further object to provide such a system which achieves a more uniform furrow opener penetration even in terraced or rolling fields without need for relatively heavy opener parts or hydraulic assist systems.

It is another object to provide an improved drill system with furrow openers that have a large vertical travel range with a generally uniform down pressure over substantially the entire range.

It is a further object to provide a toolbar-mounted furrow opener arrangement for a drill which compensates for changes in toolbar elevation or rotation to maintain an even down pressure on the opener. It is still another object to provide such an opener arrangement which advantageously utilizes the vertical rocking of press wheel standards to compensate for elevational or rotational changes in the toolbar and achieve uniform depth of penetration of the furrow opener.

It is yet another object of the invention to provide an improved tillage and drilling implement for tilling the ground and uniformly planting small grains in a single operation, even on terraced or rolling ground. It is another object to provide such an implement which is relatively low in cost and yet is reliable and versatile. It is a further object to provide such an implement which is mounted on a single main frame.

It is another object to provide an improved furrow opener and press wheel gang assembly for mounting on the rear of a tillage implement. It is still another object to provide such an assembly having reduced side forces during turns as well as a large range of vertical travel with independent relative vertical movement of individual press wheels in the assembly.

In accordance with the above objects, a plurality of furrow opener and press wheel gang assemblies are mounted on the rear beam of a frame of a field cultivator or similar type of tillage implement. Preferably two spring shank assemblies are connected to the rear beam and include fore-and-aft extending standards pivotally connected thereto and extending rearwardly to a transverse beam which connects the rear portions of the standards. A plurality of press wheels are individually connected to the beam at transversely spaced locations by pivots and structure which includes a resilient bushing to permit independent castering and limited vertical movement of the individual press wheels relative to the beam. Rearwardly of the pivotal connection of the standards to the spring shank assemblies, a hat-shaped channel member is bolted across the standards and pivotally supports a plurality of drawbar members attached to furrow openers directly ahead of the corresponding press wheels. A spring is tensioned between each furrow opener and an adjustable arm member pivotally connected to the rear beam of the frame to adjustably bias the furrow opener downwardly into the ground. The moment arm through which the spring acts to bias the furrow opener downwardly decreases as spring tension increases as a result of the standards pivoting upwardly. The upward pivoting moves the pivot center of the furrow opener assemblies closer to the line of action of the spring. Therefore, as the press wheels are biased upwardly and move the standards upwardly about their pivotal connection with the frame, the spring force increases on the furrow opener as it will be moving upwardly, but simultaneously the moment arm decreases to provide a fairly uniform down pressure on each furrow opener. A large range of vertical travel is therefore provided with a uniform down pressure over the range. The castering press wheels permit the furrow opener and press wheel gang assembly to be mounted well to the rear of the turning center of the implement without excessive side forces being exerted on the assembly. Furrow opener down pressure for each of the gang assemblies can be adjusted in a single operation. The drawbar members for each of the furrow openers can be connected either to the front or rear portion of the hat-shaped channel so that staggered or in-line furrow operation may be easily achieved with a minimum number of new components.

These and other objects, features and advantages of the present invention will become apparent to those skilled in the art from the description which follows and from the drawings.

DESCRIPTION OF THE PREFERRED EMBODIMENT

Figure 1:
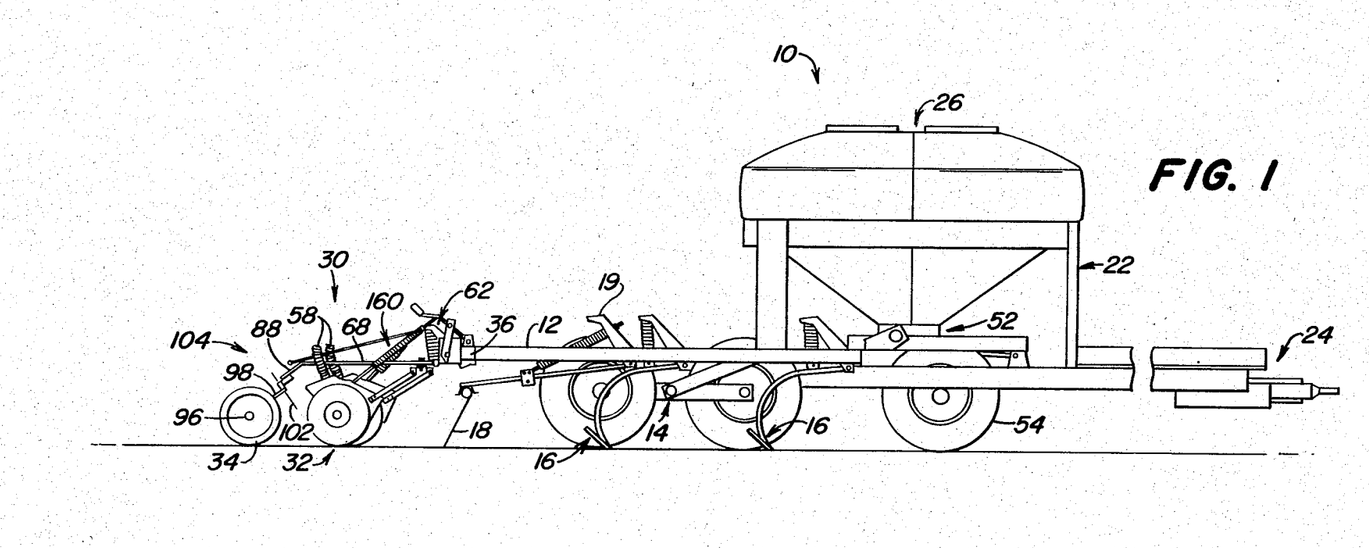
FIG. 1 is a side view of the tillage and drilling implement constructed in accordance with the teachings of the present invention.
Figure 7:
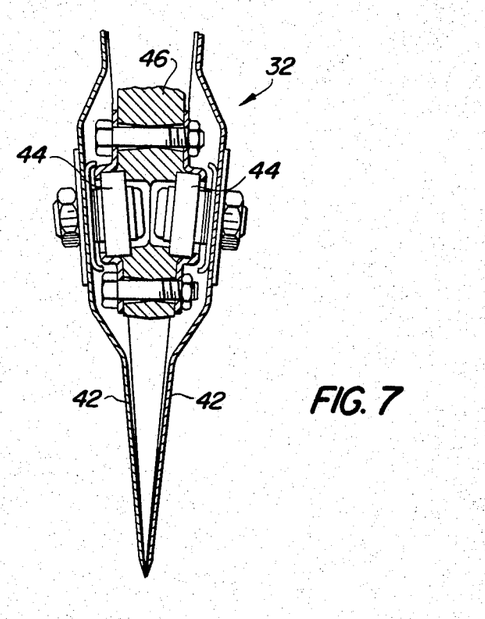
FIG. 7 is a view of the double disk opener taken substantially along lines 7—7 of FIG. 3.

Referring now to FIG. 1, therein is shown a combination tillage and drilling implement 10 including a main frame 12 supported for forward movement over the ground by vertically adjustable ground wheel assemblies 14. The main frame 12 supports a plurality of ground-working tools 16 and leveling tools 18 located rearwardly of the tools 16. In the preferred embodiment, the main frame 12 is substantially the same as a conventional field cultivator frame with tank support structure 22 and forward hitch structure 24 attached thereto to accommodate a grain and fertilizer tank assembly 26 of the type utilized with the commercially available John Deere Model 655 Air Seeder. The leveling tools 18 are preferably one or more rows of spring tines connected by spring trip standards 19 to the frame 12 for smoothing the surface of the soil worked by the tools 16. The tools 16 preferably are conventional spring trip standard mounted field cultivator shovels or sweeps. A plurality of furrow openers and press wheel gang assemblies 30, each having preferably two or more furrow opener assemblies 32 and a like number of trailing press wheels 34, are transversely spaced on rear beam 36 of the main frame 12. The furrow opener assemblies 32 are shown as conventional double disk openers (FIGS. 3 and 7), each having double disk blades 42 rotatably mounted on bearing assemblies 44 which in turn are supported on seed boot 46. A conventional air delivery system including seed and/or fertilizer meters 52 located at the bottom of the tank assembly 26 and drivingly connected to a metering wheel 54 delivers material to the air delivery system (not shown) which in turn is connected to seed or fertilizer delivery tubes 58 connected to the individual seed boots 46. The seed and fertilizer air delivery system is similar to that on the commercially available 655 Model Seeder and therefore will not be described in further detail here. It is to be understood that other types of tillage implement frames or toolbars and seed distribution arrangements and furrow openers, including single disk openers, may be used with the present invention.

Each furrow opener and press wheel gang assembly 30 having more than two press wheels and furrow openers is connected to the rear beam 36 of the frame 12 by a pair of spring shank assemblies 62 having an upwardly and rearwardly directed mounting element 64 connected by a U-bolt 66 to the beam 36. A fore-and-aft extending, elongated standard 68 is pivotally connected at its forward end to the lower portion of the mounting element 64 by a pivot 72. The mounting element 64 includes a downwardly and forwardly directed spring abutting surface 74, and a tension link 76 having an enlarged upper end is inserted through an aperture in the surface 74 and is pivotally connected to a standard clamp 78 rearwardly of the pivot 72 and forwardly of a transverse vertical plane passing through the spring abutting surface 74. A spring 82 is compressed between the surface 74 and a pin 84 (FIG. 3) located above the level of the pivot 72 on the clamp 78. The spring shank assembly 62 is generally of the type shown and described in U.S. Pat. No. 3,700,039, assigned to the assignee of the present invention, and provides a fairly constant but slightly increasing down pressure on the standard 68 as it rocks upwardly about the pivot 72. The standard 68 extends rearwardly in generally horizontal fashion from the pivot 72 over and between the furrow opener assemblies 32 to an end 88 bent downwardly at an angle to the axis of the remainder of the standard 68.

Figure 6:
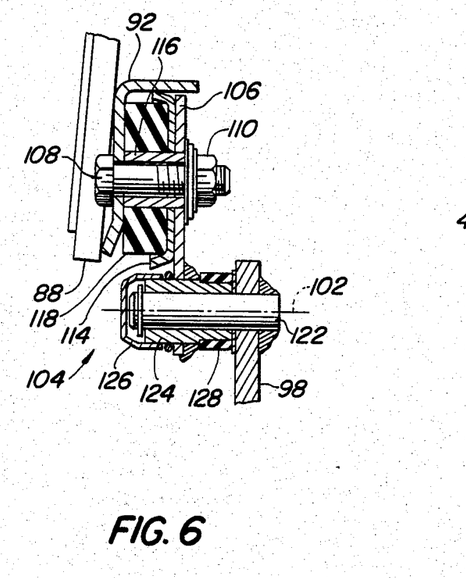
FIG. 6 is a sectional view taken substantially along the line 6—6 of FIG. 5.

An angle or rear beam member 92 extends transversely between the ends 88 of the standard 68 and is connected thereto by bolts 94. The press wheels 34 are connected by axles 96 to arms 98 which in turn are pivotally connected for rocking about upright axes 102 to the beam 92 at transversely spaced locations by connecting assemblies 104. The arms are curved outwardly at 99 to provide a clearance space adjacent the outer portions of the wheels 34 for mud and debris. The connecting assemblies 104 include a wedge-shaped press wheel pivot plate 106 connected by a bolt 108 and large flange nut 110 (FIG. 6). The pivot plate 106 is supported between an upwardly turned cup 114 and the flange nut 110. A spacer 116 extends between the lower surface of the beam 92 and the flange nut 110 and is surrounded by an annular rubber bushing 118 above the cup 114, which permits the plate 106 to rock a limited amount vertically with respect to the beam 92. An upright pivot pin 122 is welded to the forward end of the press wheel arm 98 and extends upwardly through a bushing 124 welded to the pivot plate 106. A grease cap 126 seals the upper part of the bushing 124 and a lower sealing bushing 128 prevents contaminants from entering the lower part of the bushing 124. The pivot pin 122 is greased with lubricant which is sealed within the pivot area by the sealing structure.

The connecting assemblies 104 permit the press wheels 34 to caster about the upright axes 102, which are angled rearward with respect to the vertical, to reduce side forces on the press wheels when the implement is turned from the forward direction while the press wheels are in ground contact. The ability to pivot reduces the side forces which would otherwise be present because of the large offset of the press wheels 34 rearwardly of the turning center of the implement 10. In addition, the rubber bushing 118 permits the individual press wheels 34 of each gang assembly 30 to move up and down independently of the remaining press wheels of that gang for more uniform planting even where clods or other local irregularities are present in the ground surface.

Figure 3:
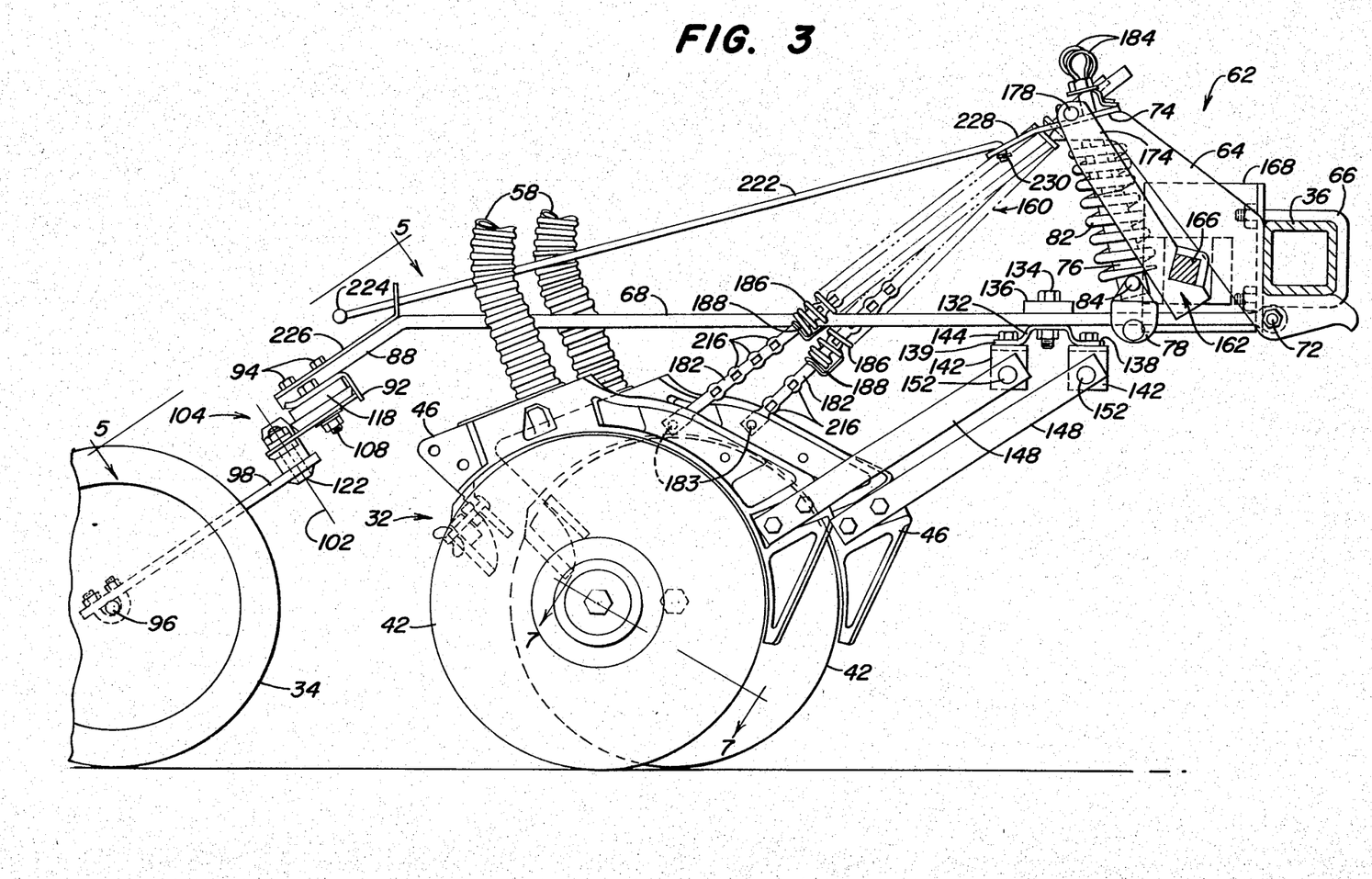
FIG. 3 is an enlarged side view of a portion of the furrow opener and press wheel gang assembly utilized with the implement of FIG. 1.
Figure 4:
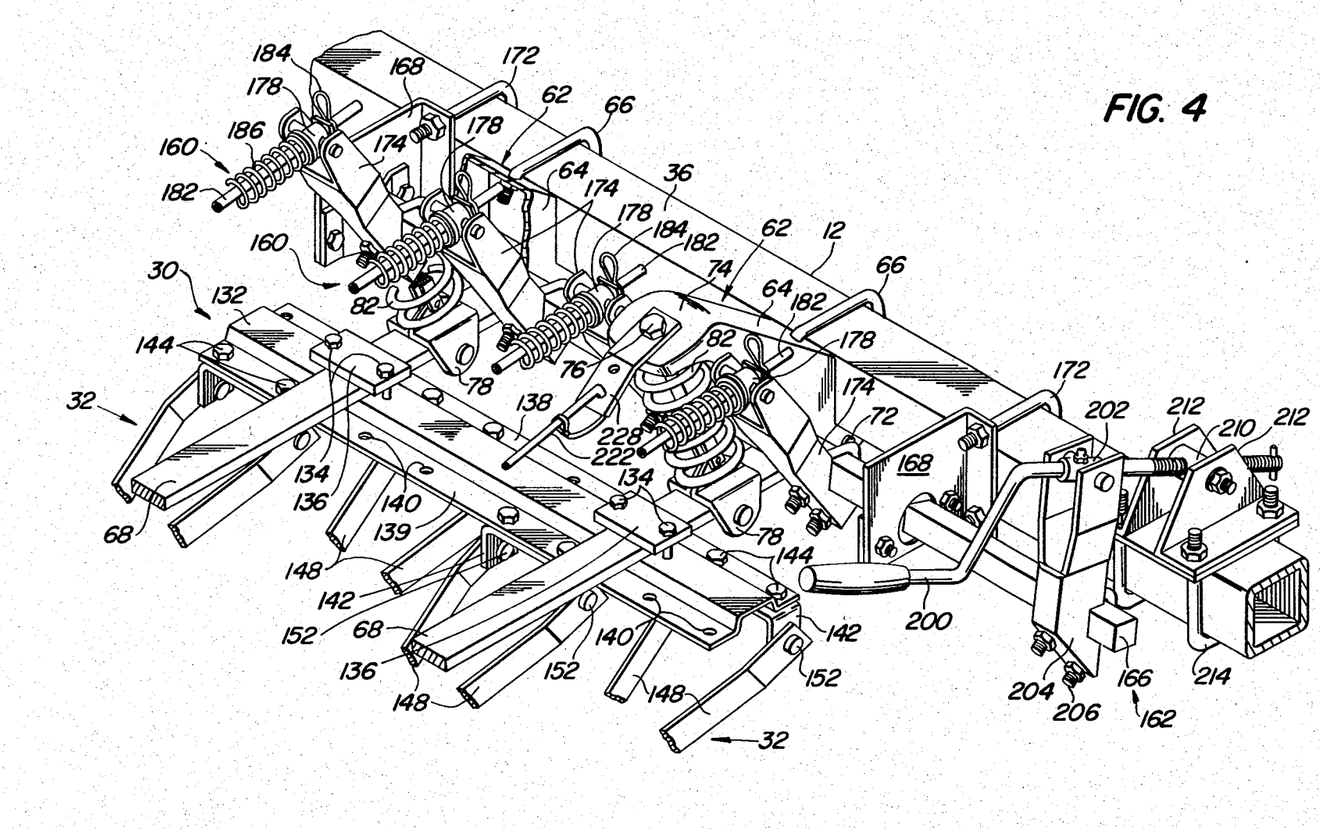
FIG. 4 is an enlarged perspective view, partially broken away for clarity, of the front portion of the furrow opener and press wheel gang assembly of FIG. 3 connected to the rear beam of the implement frame.
Figure 5:
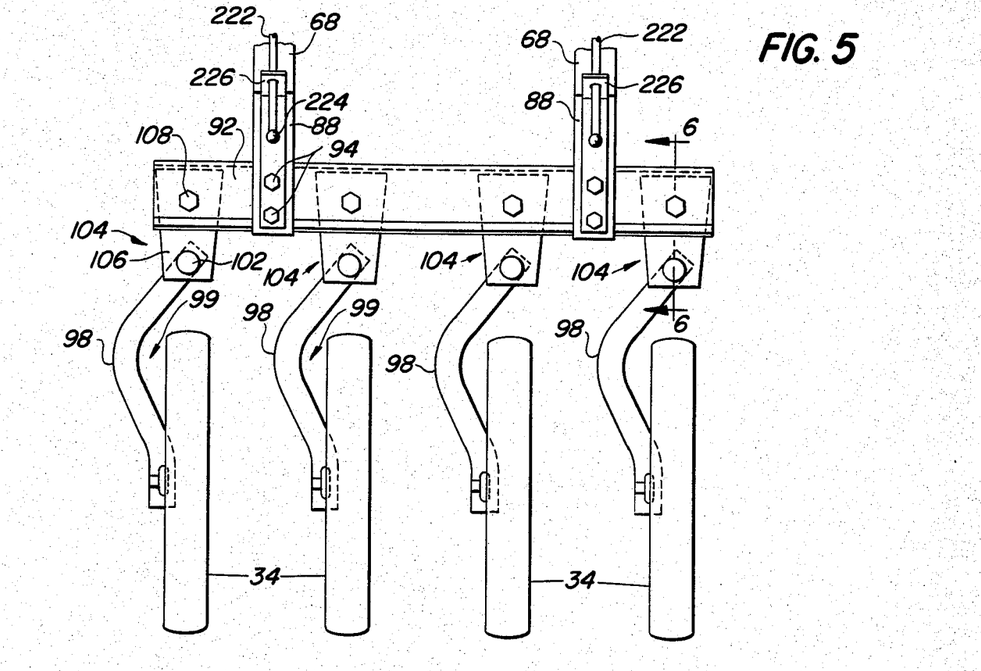
FIG. 5 is a top view of the press wheel gang of the assembly of FIGS. 1 and 3.

Supported rearwardly of the clamp 78 on the standard 68 is a transverse, hat-shaped channel member 132. A pair of bolts 134 extends through holes in a plate 136 supported on the upper surface of each standard 68 and through holes in the flat connecting portion of the channel member 132 to secure the member in transverse relationship to the standards 68 rearwardly adjacent the spring shank assemblies 62. The member 132 opens downwardly and includes forwardly and rearwardly directed flanges 138 and 139, respectively, which each include a series of transversely spaced apertures 140. A downwardly opening, U-shaped clip 142 is connected to either the front flange or rear flange 138 or 139 by a pair of bolts 144 extending through a pair of the apertures 140 and through corresponding holes in the flat connecting portion of the clip 142. Each furrow opener assembly 32 includes a pair of forwardly extending drawbar members 148 connected to the seed boot 46. The forward end of each drawbar 148 is pivotally connected to a side leg of the clip 142 by a rivet 152 so that the opener assembly 32 can pivot vertically about a transverse axis corresponding to the axis of the rivets 152. The furrow opener assemblies 32 can be mounted in staggered relationship as shown in FIGS. 1, 3 and 4 by mounting the adjacent clips 142 on alternate flanges 138 and 139 as shown in FIG. 4. For increased planting speed in fine soils, the clips may be bolted to only one of the flanges 138 or 139 so that the furrow openers will be aligned in the transverse direction.

To bias the furrow opener assemblies 32 downwardly so that the disks 42 penetrate the soil, a down pressure spring assembly 160 is connected between each seed boot 46 and the frame 12. A multiple arm adjusting assembly 162 is connected to the rear beam 36 of the frame 12, and each spring assembly 160 is supported by the assembly 162. The adjusting assembly 162 includes a square bar 166 rotatably supported rearwardly of the beam 36 and above the standards 68 by a pair of bracket assemblies 168 mounted on the beam 36 by U-bolts 172 outwardly of the spring shank assemblies 62. An upwardly and rearwardly extending adjusting arm 174 is fixed to the bar 166 in fore-and-aft alignment with each corresponding furrow opener assembly 32. Each arm 174 has a bifurcated upper end which supports a trunnion 178. The spring assembly 160 includes a rod 182 pivotally connected at one end to the seed boot 46 by a pin 183 and extending forwardly and upwardly therefrom through the trunnion 178. The rod 182 can slide in and out with respect to the trunnion 178 as the furrow opener assembly 32 pivots up and down, but a pin 184 prevents the rod 182 from sliding out of the trunnion and limits the downward rocking of the assembly 32. A spring 186 is compressed between the trunnion 178 and an adjustable sliding clip member 188 located on the rod 182. The spring 186 acts against the clip 188 and the rod 182 to bias the furrow opener assembly 32 downwardly about the pivot 152.

A crank 200 (FIG. 4), rotatably mounted in a trunnion 202 which is connected to the bifurcated end of an arm 204 fixed to the square bar 166 by a U-bolt 206, may be rotated to adjust the angle of the arms 174 and therefore the compression of the springs 186. The crank 200 has a threaded end which is threaded through a trunnion 210 mounted on a suitable conventional bracket 212 fixed to the beam 36 by U-bolts 214. Each clip 188 may also be adjusted to any of the retaining positions 216 to adjust the compression of the corresponding spring 186. The multiple adjusting arm assembly 162 permits the down pressure on an entire gang of furrow opener assemblies 32 to be adjusted simultaneously.

As best seen in FIG. 3, the effective moment arm through which the force of the compressed spring 186 acts to bias the corresponding furrow opener assembly 32 downwardly into the soil is dependent on the location of the pivot center 152 about which the assembly rotates. Therefore, as the standards 68 move upwardly as a result of implement frame rotation or ground contour, the pivot centers 152 will move upwardly with the standards 68 to positions closer to the lines of action of the springs 186 and thereby decrease the moment arms through which the springs 186 act. At the same time, the furrow opener assemblies 32 will be rocking upwardly about the pivot centers 152 as a result of the frame rotation or ground contour to thereby compress the spring 186 and increase the spring force. However, because the effective moment arm has decreased with upward movement of the pivot centers 152, the down pressure on the furrow opener assemblies 32 will remain substantially constant. As the furrow opener assemblies 32 move downwardly, the forces exerted by the springs 186 decreases. At the same time the standards 68 will move downwardly to maintain the press wheels 34 in soil-firming relationship with the ground, and the resulting downward movement of the pivot centers 152 increases the effective moment arm through which each spring 186 acts to maintain a substantially constant down pressure on the corresponding furrow opener assemblies 32. The arrrangement of the furrow opener assemblies 32 and the standards 68 as shown in FIG. 3 provides a substantial range of vertical travel for both the press wheels 34 and the furrow opener assemblies 32. The spring shank assemblies 62 maintain a fairly constant down pressure on the press wheels 34 while the movement of the pivot centers 152 with rocking of the standards 68 compensates for changing pressure in the springs 186 to maintain a substantially constant down pressure on the furrow opener assemblies 32. To maintain a more consistent geometry between front and rear opener assemblies 32 when staggered, the adjusting arm 174 for the forward opener assembly 32 is shorter than the arm 174 for the rear assembly 32 so that the spring assemblies 160 will be approximately parallel and equally spaced from their respective pivots 152 as viewed in FIG. 3. The arm 174 for the forward opener is simply replaced with a shorter arm when converting from in-line to staggered alignment.

To prevent the standards 68 and the press wheels 34 from dropping too low when the frame 12 is raised on the ground wheel assemblies 14 for transport, a tension rod 222 is connected between each spring trip assembly 62 and the corresponding end 88 of the standard 68. The rod 222 has an enlarged lower end 224 and is slidably received through a bracket 226 connected to the end 88 by the bolts 94. A strap 228 is supported on the spring shank assembly 62 by the tension link 76 and includes an aperture through which an angled portion of the upper end of the rod 222 is inserted and held in position by a pin 230. As the implement 10 is raised from the position shown in FIGS. 1 and 3, the standard 68 will lower until the enlarged end 224 of the tension rod 222 contacts the bracket 226 and prevents further downward pivoting of the standard 68. The rods 182 prevent the furrow opener assemblies 32 from dropping below a preselected location when the frame 12 is raised for transport. The tension rod 222 permits the standard 68 to rock upwardly in the transport position should a large gulley or hump in the road be encountered during transport. The press wheels 34 are free to pivot during transport so that if, during a turn, the press wheels hit a clump of dirt or are forced into contact with the ground because of local irregularities in the surface, they are still protected from severe side forces.

Figure 2:
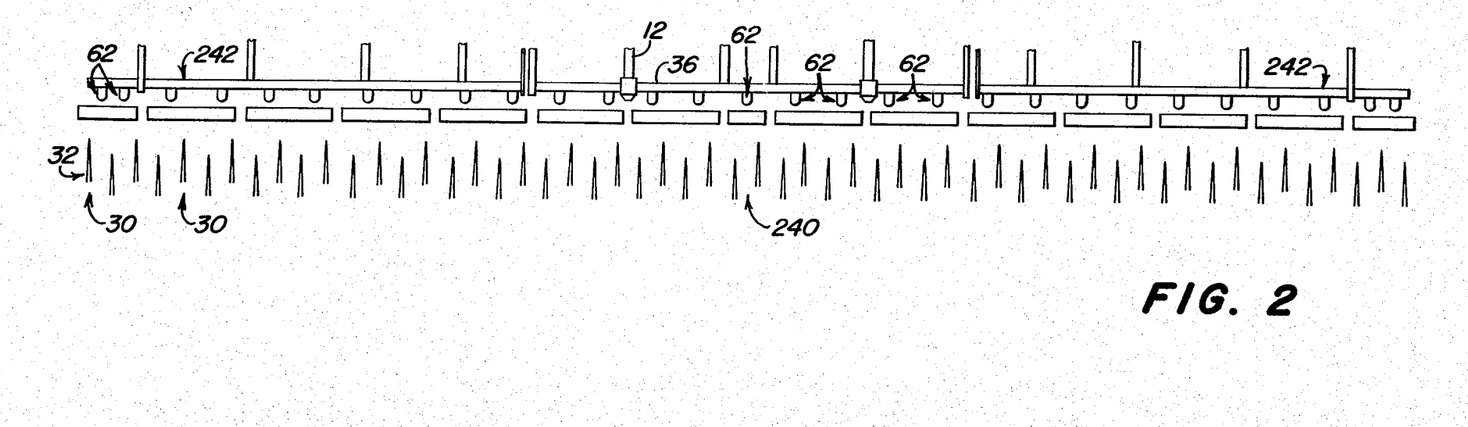
FIG. 2 is a top view, shown schematically, of a portion of the rear of a three-section implement illustrating various combinations of furrow opener and press wheel gang assemblies attached thereto.

In the preferred embodiment, each furrow opener and press wheel gang assembly 30 includes a gang of two, three or four furrow openers 32 and a like number of trailing press wheels 34. As represented in FIG. 2, different sized gangs can be attached to the main frame 12 as necessary to achieve the desired working width. In the preferred embodiment, two spring shank assemblies 62 are utilized to connect the assemblies to the main frame 12; however, a single assembly 62 may be utilized to connect a gang having only two openers and two press wheels, such as shown at 240 in FIG. 2. A pair of outrigger frames 242 are hingedly connected to the main cultivator frame 12 and can be easily lifted with their corresponding furrow opener and press wheel gang assemblies 30 to an upright storage position for convenient transport. On the folding outrigger frames 242, the press wheels 34 will be far removed from the surface of the ground in the transport position so that tension rods 222 are not necessary.

Having described the preferred embodiment, it will be apparent that modifications can be made without departing from the scope of the invention as defined in the accompanying claims.

I claim:

1. In a seeding implement including a transversely extending main frame adapted for forward movement over the ground, a furrow opener and press wheel arrangement, comprising:
   two fore-and-aft extending and transversely spaced standards pivotally connected at their forward ends to the main frame for rocking vertically with respect to the frame;
   a rear transverse support member connected between the aft ends of the standards for rocking with the standards;
   a plurality of press wheel assemblies transversely spaced on the rear transverse support member, each press wheel assembly including a wheel mounted for rotation about an axis generally transverse to the forward direction, said press wheel assemblies including resilient means connected between the respective wheels and the rear transverse support member for permitting limited vertical movement of the press wheels relative to each other and the rear transverse support member;
   means for biasing the standards downwardly with respect to the main frame while permitting the standards to rock upwardly about the respective pivots against the bias as the press wheels move over contours and other irregularities in the ground surface;
   a plurality of furrow openers, each opener including a fore-and-aft extending drawbar member;
   means pivotally connecting the forward end of each drawbar member to the standard for rocking with the standard rearwardly of the forward end of the standard with the furrow opener forwardly of, and aligned with, a corresponding press wheel, said means pivotally connecting rockable vertically with the standards as the latter rock with respect to the main frame; and
   spring means connected between the frame and the furrow opener for providing a spring force acting through an effective moment arm dependent on the vertical position of the means pivotally connecting to bias the furrow opener about the pivotal connection into the ground, said moment arm decreaing as the standard moves upwardly so that as the furrow opener and standard rock upwardly over the irregularities and the spring force increases, the moment arm decreases to reduce fluctuations in the furrow opener bias.

2. The invention as set forth in claim 1 wherein the press wheel assemblies include means pivotally connecting the press wheel to the rear support member for rocking about an upright axis forward of the axis of rotation.

3. The invention as set forth in claim 1 wherein the means for biasing the standard downwardly includes means for biasing the standard downwardly with generally constant force as the standard rocks with respect to the frame.

4. In a seeding implement including a transversely extending main frame adapted for forward movement over the ground, a furrow opener and press wheel assembly, comprising:
   a rear transverse support member;
   a plurality of press wheels carried on the rear support member for rotation about a transverse axis;
   at least two standards connected to the rear support member at transversely spaced locations on said rear support member, said standards extending forwardly therefrom and terminating in forward ends;
   means pivotally connecting the forward ends of the standards to the main frame for permitting rocking of the standards and rear support member vertically with respect to the frame;
   means for resiliently biasing the rear support member downwardly to urge the press wheels into soil-firming relationship with the ground;
   a forward transverse support member connected to the standards rearwardly of the pivotal connection with the frame and forwardly of the rear support member, said forward support member rockable vertically with the standards;
   a plurality of furrow openers;
   means pivotally connecting the furrow openers to the forward support member forwardly of the respective press wheels for rocking vertically about transverse pivotal axes over a range of positions, said pivotal axes rockable with the forward support member; and
   spring means compressed between the main frame and the furrow openers for biasing the openers into the ground, said spring means providing a changing spring force dependent on furrow opener position, said spring force acting through a changing effective moment arm which increases and decreases as the pivotal axes rock downwardly and upwardly, respectively, with the forward transverse member for biasing the furrow openers into the ground with a generally constant pressure over the range of vertically rocked positions.

5. The invention as set forth in claim 4 wherein the spring means includes a spring extending upwardly and forwardly from each furrow opener opener and compressed between the device and the implement frame, said spring having a line of force extending above the forward transverse member, the distance between the line of force and the forward transverse member decreasing as the latter rocks upwardly with the standard.

6. The invention as set forth in claim 5 including adjusting means connected to the main frame for simultaneously adjusting the compression of said springs.

7. The invention as set forth in claim 6 wherein the adjusting means includes a transverse bar pivotally connected to the main frame, a plurality of arms fixed to and extending upwardly from the bar, and a spring compression member connected to each arm and bearing against the spring.

8. The invention as set forth in claim 4 including a resilient means connecting the individual press wheels to the rear support member for permitting independent vertical rocking of the press wheels with respect to the support member.

9. A tilling and planting implement, comprising:
a cultivating implement including a transversely extending main frame adapted for forward movement over the ground, said main frame supporting a plurality of transversely spaced earthworking tools and including a rearwardly disposed transverse beam;
a plurality of fore-and-aft extending standards pivotally connected at their forward ends to the beam for rocking vertically;
a plurality of transversely spaced press wheels supported for rotation adjacent the aft ends of the standards;
a transverse support member extending between the standards rearwardly of the pivotal connections of the standards with the beam for rocking vertically with the standards;
a plurality of furrow opening devices supported from the transverse support member forwardly of the respective press wheels and including drawbar means pivotally connected to the transverse support member rearwardly of the forward ends of the standards for rocking vertically about respective transverse pivotal axes, the location of said pivotal axes being dependent on the rocked position of the transverse support member; and
a spring compressed between each of the furrow opening devices and the beam for biasing the devices downwardly into the ground, the line of force of the spring acting through a moment arm the length of which is dependent on the location of the corresponding pivotal axis, said moment arm length decreasing as the transverse support member rocks upwardly with the standards.

10. A combination tillage and planting implement comprising:
a transversely extending main frame adapted to be towed forwardly over a field to be planted, said frame including a rear transverse beam;
a plurality of earthworking tools connected to the main frame;
a plurality of planting devices connected to the rear beam, said planting devices arranged in gangs in trailing relationship to the main frame and generally aligned in the transverse direction, a gang comprising: at least one standard pivotally connected to the rear beam for rocking about a first transverse axis, said standard extending rearwardly from the pivot to a trailing end located a substantial distance behind the frame; a forward transverse support member connected to the standard rearwardly adjacent the pivotal axis; a rear transverse support member connected to the trailing end; a plurality of furrow opener assemblies spaced on the forward transverse support member, each opener assembly including a drawbar member pivotally connected to the forward transverse support member for rocking about a drawbar axis located rearwardly of the first axis, the drawbar axis shifting vertically as the standard rocks; a seed boot and a furrow opener connected to the seed boot; a plurality of press wheel assemblies transversely spaced on the rear transverse support member, each assembly including a press wheel mounted for rotation in trailing relationship to a corresponding furrow opener;
means yieldingly urging the standard downwardly about its pivotal connection with the main frame for maintaining the press wheels in soil-firming relationship with the ground;
down pressure means urging the furrow opener assemblies downwardly about their respective axes and responsive to the shifting of the drawbar axes for maintaining a generally constant soil-penetrating force on said opener assemblies;
a storage tank assembly connected to the main frame for containing seeds to be planted;
a seed conduit communicating with the seed boot; and
metering means for delivery of seed from the storage tank to the seed boot via the seed conduit.

11. The invention as set forth in claim 10 wherein the main frame comprises a field cultivator frame and the earthworking tools comprise field cultivator standards.

12. The invention as set forth in claim 10 wherein the furrow openers comprise double disk openers, and including means for selectively connecting the drawbar members to the first transverse member with the openers in either staggered or aligned relationship.

13. The invention as set forth in claim 10 including means mounting the press wheels for castering about upright axes to prevent excessive side forces on the press wheel assemblies during turns.

14. The invention as set forth in claim 13 including resilient means for permitting independent vertical rocking of the individual press wheels relative to each other and the rear transverse member.

15. The invention as set forth in claim 10 wherein the metering means comprises an air distribution system.

16. The invention as set forth in claim 10 wherein the tillage frame includes a folding outrigger frame supporting at least one of said gangs, said at least one gang being foldable upwardly with the outrigger frame.

17. The invention as set forth in claim 10 including tension means extending between the frame and the standard for limiting the extent of downward rocking of the standard while permitting free upward rocking of the standard.

18. The invention as set forth in claim 3 wherein the main frame includes ground wheel assemblies, and the press wheels are located substantially behind the ground wheel assemblies and include pivot means for permitting the press wheels to caster about upright axes as the main frame is turned from the forward direction on the ground wheel assemblies.

19. The invention as set forth in claim 10 further comprising a transverse row of spring tines supported from the frame rearwardly of the main earthworking tools and forwardly of the furrow opener.

20. In a seeding implement having a transversely extending main frame and adapted for forward movement over the ground, a furrow opener and press wheel arrangement, comprising:
at least two fore-and-aft extending standards connected at their forward ends to, and transversely spaced on, the main frame for rocking with respect to the main frame in an upright plane;
a forward transverse support member extending between the standards adjacent their forward ends, and a rear transverse support member extending between the standards adjacent their rearward ends, said support members rockable vertically with the standards;
a plurality of press wheels mounted on the rear transverse support member in transversely spaced relation for rotation about an axis generally transverse to the forward direction;
means for biasing the standards downwardly with respect to the frame while permitting the standards to move upwardly against the bias as the press wheels move over contours and irregularities in the ground surface;
a plurality of furrow openers, each including a drawbar member;
means pivotally connecting the drawbar members in transversely spaced relation on the forward support member with each of the furrow openers forwardly of, and aligned with, a corresponding one of the press wheels, said pivotal connection of the drawbar member rockable vertically with the standards as the latter rock with respect to the frame, wherein the forward support member includes fore-and-aft spaced mounting means for permitting the drawbar members to be selectively attached with the furrow openers in either transversely staggered or aligned relationship; and
spring means connected between the frame and the furrow openers and having a spring force acting through an effective moment arm dependent on the vertical position of the standards to bias the furrow opener about the pivotal connection into the ground, said moment arm decreasing as the standard moves upwardly and the spring force increases so that the downward bias remains generally constant.

21. The invention as set forth in claim 20 including means pivotally connecting each press wheel to the rear transverse support member for rocking about an upright axis forward of the axis of rotation.

22. The invention as set forth in claim 20 wherein the forward support member is a channel-shaped beam and the spaced mounting means include front and rear flanges extending along the beam, and wherein the drawbar members are selectively connectible to either the front or the rear flange.

23. The invention as set forth in claim 20 wherein the means connecting the press wheels to the rear transverse support member includes resilient means for permitting limited vertical movement of the press wheels relative to each other and the rear transverse support member.

* * * * *

UNITED STATES PATENT AND TRADEMARK OFFICE
CERTIFICATE OF CORRECTION

PATENT NO. : 4,528,920
DATED : 16 July 1985
INVENTOR(S) : Lowell H. Neumeyer

It is certified that error appears in the above-identified patent and that said Letters Patent is hereby corrected as shown below:

Column 8, line 14, change "decreaing" to -- decreasing --;

Column 11, line 7, add -- main -- before "frame" and delete "main" before "earthworking".

Signed and Sealed this

Twentieth Day of May 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,528,920
DATED : 16 July 1985
INVENTOR(S) : Lowell H. Neumeyer

It is certified that error appears in the above-identified patent and that said Letters Patent is hereby corrected as shown below:

Column 9, line 6, delete "opener", second occurrence;

line 7, change "device" to --opener--.

Signed and Sealed this

Twenty-ninth Day of July 1986

[SEAL]

Attest:

DONALD J. QUIGG

Attesting Officer    Commissioner of Patents and Trademarks